United States Patent
Callegaro et al.

(10) Patent No.: US 6,232,303 B1
(45) Date of Patent: May 15, 2001

(54) PROCESS FOR PREPARING A HYALURONIC ACID FRACTION HAVING A LOW POLYDISPERSION INDEX

(75) Inventors: Lanfranco Callegaro, Thiene; Davide Renier, Padua, both of (IT)

(73) Assignee: Fidia Advanced Biopolymers S.r.l.

( * ) Notice: Subject to any disclaimer, the term of this patent is extended or adjusted under 35 U.S.C. 154(b) by 0 days.

(21) Appl. No.: 09/426,536

(22) Filed: Oct. 26, 1999

Related U.S. Application Data

(62) Division of application No. 09/096,646, filed on Jun. 12, 1998, now Pat. No. 6,020,484.

(30) Foreign Application Priority Data

Dec. 20, 1995 (IT) .................................. PD95A0244

(51) Int. Cl.$^7$ ................ A61K 31/70; C07H 5/04

(52) U.S. Cl. ............... 514/54; 536/55.1; 536/55.2
(58) Field of Search ................. 536/55.1, 55.2; 514/54, 55.2

(56) References Cited

U.S. PATENT DOCUMENTS

| | | | | |
|---|---|---|---|---|
| 5,442,053 | * | 8/1995 | delle Valle et al. | 536/55.1 |
| 5,646,129 | * | 7/1997 | Callegaro et al. | 514/54 |
| 6,020,484 | * | 2/2000 | Callegaro et al. | 536/55.3 |

* cited by examiner

*Primary Examiner*—Elli Peselev
(74) *Attorney, Agent, or Firm*—Hedman & Costigan, P.C.

(57) ABSTRACT

A process for preparing a hyaluronic acid fraction having an average molecular weight comprised between 5000 and 300,000 and a polydispersion index lower than 1.7, comprising treating the starting high molecular weight hyaluronic acid, contemporaneously with sodium hypochlorite and ultrasounds.

38 Claims, 3 Drawing Sheets

PROCESS FOR PREPARING A HYALURONIC ACID FRACTION HAVING A LOW POLYDISPERSION INDEX

This is a divisional of application Ser. No. 09/096,646, filed Jun. 12, 1998, now U.S. Pat. No. 6,020,585.

FIELD OF THE INVENTION

The present invention relates to a process for preparing a hyaluronic acid fraction having an average molecular weight comprised between 5000 and 300,000 and a polydispersion index lower than 1.7, comprising treating contemporaneously the starting high molecular weight hyaluronic acid, with sodium hypochlorite and ultrasounds.

TECHNOLOGICAL BACKGROUND

Hyaluronic acid is a natural, linear polysaccharide, biocompatible and biodegradable, constituted by a repeating disaccharide unit formed by glucuronic and N-acetylate glucosamine linked by glycoside bonds β 1–3 and α 1–4.

Hyaluronic acid is present in the connective tissues of higher organisms, in the synovial fluid, in the umbilical cord and in cockscombs; it can also be synthesized from certain bacterial forms such as Streptococci (Kendall et al, Journ. Biol. Chem., vol. 118, page 61, 1937).

Hyaluronic acid plays a vital role in many biological processes, such as tissue hydration, proteoglycan organization, cell differentiation and angiogenesis. There are many biomedical applications linked with the Theological properties of hyaluronic acid solutions: one important sector is that of surgery to the eye (Grav et al, Exp. Eye Res., vol. 31, page 119, 1979). Other biomedical applications involving hvaluronic acid and its derivatives such as hyaluronic esters as described by della Valle and Romeo, EP 0216453, 1987), concern the processes linked with tissue repair (lesions, burns).

As regards low-molecular-weight fractions, various fields of application are being successfully explored in dermatology (Scott EP0295092) B1, 1987) and pharmacology. Certain biological properties have proved to be sensitive to decreases in molecular weight and to. the function of the distribution curve characterized by various localization and dispersion indices (Mw, Mn, Mz) and by polydispersion index. For example, low-molecular-weight hyaluronic acid fractions act as potential angiogenic substances, acting on the polysaccharide's ability to increase vascularization, or intervening in the inflammatory processes as specific inhibitors of factors such as TNF (Noble et al, J. Clin. Inv., vol. 91, page 2163, 1993). Moreover, low-molecular-weight fractions of hyaluronic acid can be used in bone formation phenomena and as antiviral agents.

There are many examples of the preparation of hyaluronic acid fractions obtained by physical methods involving for example heating, ultrasounds, UV and gamma irradiation, or by enzymatic reactions using hyaluronidase (Chabreck et al., Jour. Appl. Poly. Sci., vol. 48, page 233, 1991; Rehakova et al., Int. J. Biol. Macrom., vol. 16/3 page 121, 1994); or, again, by chemical depolymerizing reactions with ascorbic acid (Cleveland et al., Bioch. Biophy. Acta, vol. 192, page 385, 1969) or by treatment with hypochlorites (Schiller et al, Biol. Chem. Hopp-Seyler, vol. 375, page 169, 1994). However, all the cited methods are flawed in some way with regard to the type of products obtained. Indeed, even though some of them do not modify the primary polymeric structure, intervening on the glycoside bonds, they are unable to generate degraded, low-molecular-weight products characterised by low polydispersion index. Indeed, it has been seen that techniques using ultrasounds or heat produce depolymerization kinetics which present asymptotic patterns. Further treatments for the same time and in the same conditions (ultrasound power and temperature) lead to the product's complete degradation.

Unlike these physical methods, depolymerization induced by the action of hyaluronidase presents certain advantages such as the efficacy of the reaction with consequent maintenance of the primary structure of the polymeric chain and control of the degradation kinetics. Observance of these parameters does not, however, guarantee high chemical yields or products characterized by low molecular weight distribution.

Lastly, the extensive action of chemical agents such as sodium hypochlorite and ascorbic acid, leads simultaneously to a loss of molecular weight and to a significant alteration in the chemical structure of the polymeric chain. Degradation derivatives with the desired molecular profile can only be obtained by a careful and controlled use of these reagents, so that the potential use of the chemical process on an industrial scale is greatly reduced.

SUMMARY OF THE INVENTION

The present invention relates to a process for preparing a fraction of a hyaluronic acid or a salt thereof having an average molecular weight ranging from 5,000 to 300,000 comprising treating a hyaluronic acid or a salt thereof having average molecular weight comprised between 50,000 and 10,000,000 with ultrasounds contemporaneously in the presence of sodium hypochlorite at such a concentration that the molar 4 ratio sodium hypochlorite/hyaluronic acid repeating unit (HA r.u.) is comprised between 0.01 and 5 and for a time lower than 240 minutes.

DETAILED DESCRIPTION OF THE INVENTION

Figure 1:
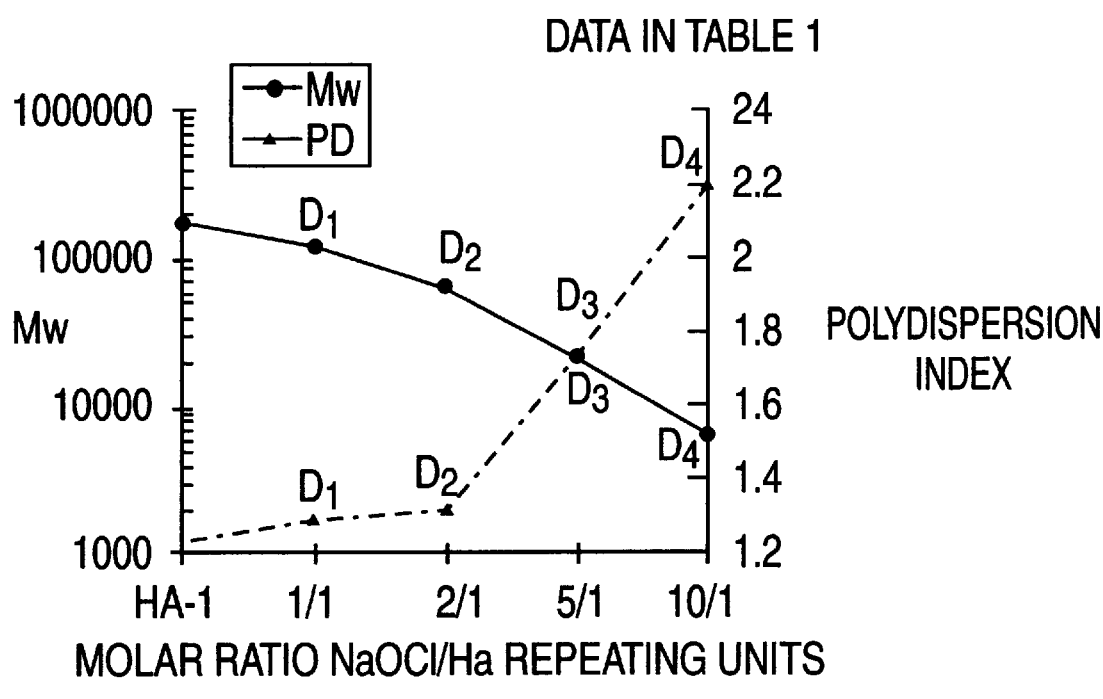
FIG. 1 represents, in the form of a diagram, the results of the depolymerization carried out only with sodium hypochlorite for 8 hours on a starting hyaluronic acid having an average molecular weight of 175,000 by using molar ratios NaOCl/HA r.u. ranging from 1.0 to 10.0 said molar ratios are reported on the abscissae axis, the average molecular weights are reported on the left axis of ordinates and the polydispersion indexes are reported on the right axis of ordinates.

The process according to the present invention may be used for depolymerizing hyaluronic acid or a salt thereof having different molecular weights.

For example it may be used for depolymerizing hyaluronic acid extracted from cockscombs as described in EP 0138572 and in EP-A-25 0535200 having an average molecular weight ranging from 100,000 to 1,500,000.

In this case the hyaluronic acid fraction have preferably a molecular weight of from 5,000 to 50,000, more preferably in the following ranges: 5,000–10,000, 10,000–15,000, 15,000–25,000, and 25,000–50,000.

The process according to the present invention may for example also be advantageosuly used for depolymerizing commercial hyaluronic acid coming from the fermentation techniques and being characterized by having rather a high molecular weight, generally ranging from 1,000,000 to 5,000,000, and with the depolymerization process according to the present invention it is possible to obtain from said hyaluronic acid fractions a hyaluronic acid having an average molecular weight comprised in the range of from 50,000 to 300,000. Finally the process according to the present invention may also be advantageously carried out on high molecular weight fractions of hyaluronic acid obtained by means of the in vitro synthesis disclosed in PCT patent application Ser. No. WO 95/24497, said hyaluroninc acid being characterized by having a molecular weight ranging from 50,000 to 10,000,000.

The process according to the present invention is generally carried out on NaCl aqueous solution containing the starting hyaluronic acid or the salt thereof at concentrations preferably of 10 mg/ml and at temperatures preferably of 4° C. In the process according to the present invention the NaOCl is generally added to said solution in the form of an aqueous solution at concentrations generally ranging from 1 to 20% by weight.

In the process according to the present invention the NaClO is preferably added at such a concentration that the molar ratio NaClO/HA r.u. is comprised between 0.5 and 2.5.

The process according to the present invention is preferably carried out for a time comprised between 120 and 240 minutes.

The ultrasounds have preferably a power comprised between 50 and 200 Watt and a frequency ranging from 10 to 50 Hz.

Moreover the process according to the present invention provides depolymerization kinetics which can be controlled and traced by simple mathematical functions, but above all, as previously stated, it allows to obtain polysaccharide fractions having a low polydispersion index (Pd values= Mw/Mn<1.7), which would otherwise only be obtainable by lengthy and expensive purification processes.

The molecular weights and polydispersion indexes values were determined, by dimensional exclusion chromatography combined with various instruments of measurement such as a refraction index (RI) and multi-angle laser light scattering (MALLS).

The Applicant has in fact unexpectedly found that only the contemporaneous treatment with NaClO and ultrasounds allows to reach this objective, whereas the alternative processes in which the ultrasounds technique and the NaClO are added in two separate steps did not succeed in obtaining contemporaneously low molecular weights fractions and also a low polydispersion index.

In fact the following 3 alternative methods were carried out:

1) method 'A': depolymerization obtained by the addition of a solution of sodium hypochlorite followed by treatment of the resulting solution with ultrasounds.

2) method 'B': depolymerization by the action of ultrasounds, in two separate, consequential steps, at a given power setting and with the addition of a solution of sodium hypochlorite.

3) method 'C': depolymerization obtained by the combined, simultaneous action of a solution of sodium hypochlorite and ultrasounds.

To facilitate comparison of the three methods, we tried to render the reaction variables (concentration of hyaluronic acid, concentration of hypochlorite, ultrasound power etc.) as stable as possible. Starting with solutions of hyaluronic acid obtained by extraction with a MW ranging between 100,000 and 1,500,000, and a concentration of 20 mg/ml, the degradation kinetics was studied of the polymer by treatment with solutions (5%) of hypochlorite at different molar ratio NaClO/HA r. u.at 50° C. for periods varying between 1 and 48 hours. The aim was to produce hyaluronic acid fractions with molecular weights between 5,000 and 20,000 Da with a polydispersion index $\leq 1.7$.

Figure 2:
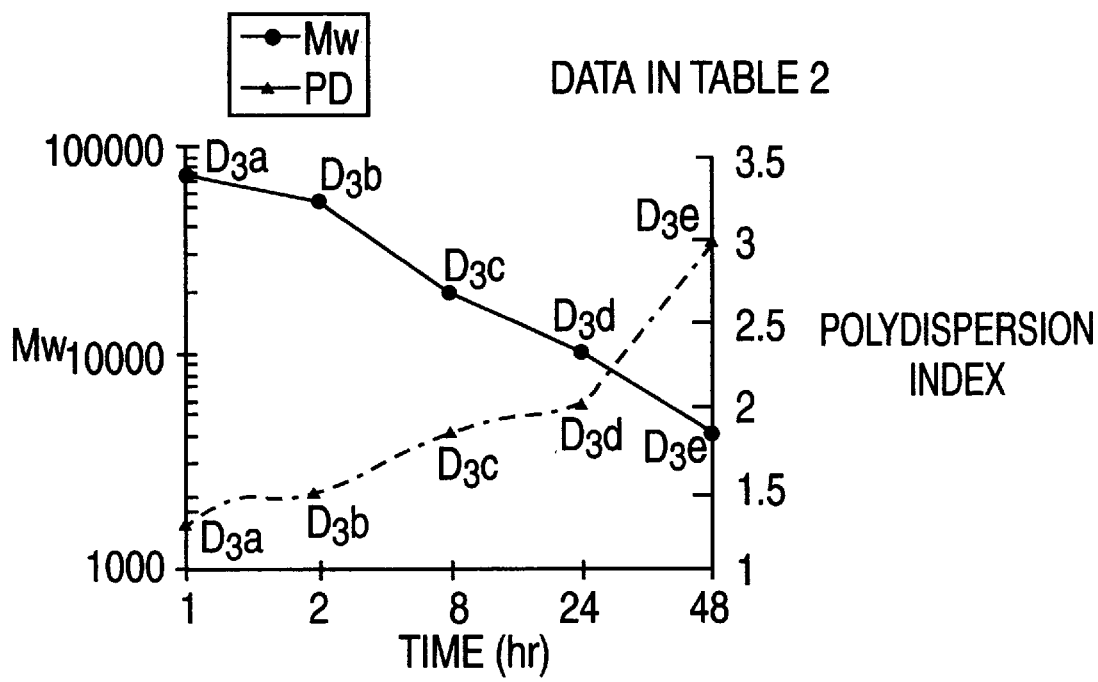
FIG. 2 represents the graph of degradation kinetics of the depolymerization carried out only with sodium hypochlorite at the molar ratio: NaOCl/HA r.u.=5.0, wherein the time (hr) is reported on the abscissae axis, the average molecular weights are reported on the left ordinates axis and the polydipsersion index are reported on the right ordinates axis.

FIG. 1 represents the hyaluronic acid fractions and the polydispersion index obtained by leaving the starting hyaluronic acid HA-1 having an average molecular weight of 175,000 to react for 8 hours with solutions of sodium hypochlorite at different molar ratio NaClO/HA r.u., of between 1.0 and 10 reported on table 1 and taking the molar ratio value of 5.0 a curve was contructed and represented in FIG. 2 of the degradation kinetics with the data reported in Table 2.

TABLE 1

| Product | code | MW | PD |
|---|---|---|---|
| natural HA | HA-1 | 175,000 | 1.24 |
| HA degr. with molar ratio: NaCl0/HA r.u.: 1/1 | D1 | 119,000 | 1.29 |
| HA degr. with molar ratio NaCl0/HA r.u.: 2/1 | D2 | 64,000 | 1.32 |
| HA degr. with molar ratio NaCl0/HA r.u.: 5/1 | D3 | 21,000 | 1.81 |

TABLE 1-continued

| Product | code | MW | PD |
|---|---|---|---|
| HA degr. with molar ratio NaClO/HA r.u.: 10/1 | D4 | 6,000 | 2.2 |

TABLE 2

| Product | code | MW | PD |
|---|---|---|---|
| Time: 1 hr | D3-a | 73,000 | 1.35 |
| Time: 2 hrs | D3-b | 56,000 | 1.41 |
| Time: 8 hrs | D3-c | 21,000 | 1.81 |
| Time: 24 hrs | D3-d | 11,500 | 1.98 |
| Time: 48 hrs | D3-e | 5,000 | 3.00 |

It comes out from the data obtained that it is difficult to obtain hylauronic acid fractions characterized by molecular weights of less than 20,000 D and by a polydispersion index with a numerical value (Mw/Mn) not exceeding 1.7. By using quantities of depolymerizing agent and/or increasing the reaction time, it is not possible to obtain fractions of hyaluronic acid with the desired molecular profile characteristics (complete degradation of the polymer).

To complete our study of method A, we used the fractions coded as D2 and D3-b, separated from the reaction mixture by precipitation with an organic mixture constituted by methanol and acetone. After solubilization in a 0.15M solution of NaCl, these are treated with ultrasounds at a power setting of between 150 and 200 W and a frequency of 20 KHz for between 15 minutes and 8 hours. Table 3 reports the MW and polydispersion index values revealed by GPC chromatography.

TABLE 3

| Fraction | D2 | | D3-b | |
|---|---|---|---|---|
| Time (min) | MW | PD | MW | PD |
| 0 | 64,000 | 1.32 | 56,000 | 1.41 |
| 15 | 62,000 | 1.32 | 51,500 | 1.43 |
| 30 | 57,000 | 1.33 | 47,500 | 1.43 |
| 60 | 52,500 | 1.35 | 44,000 | 1.45 |
| 120 | 48,000 | 1.35 | 41,500 | 1.47 |
| 240 | 46,500 | 1.36 | 39,000 | 1.51 |
| 480 | 42,000 | 1.41 | 37,500 | 1.53 |

Figure 3:
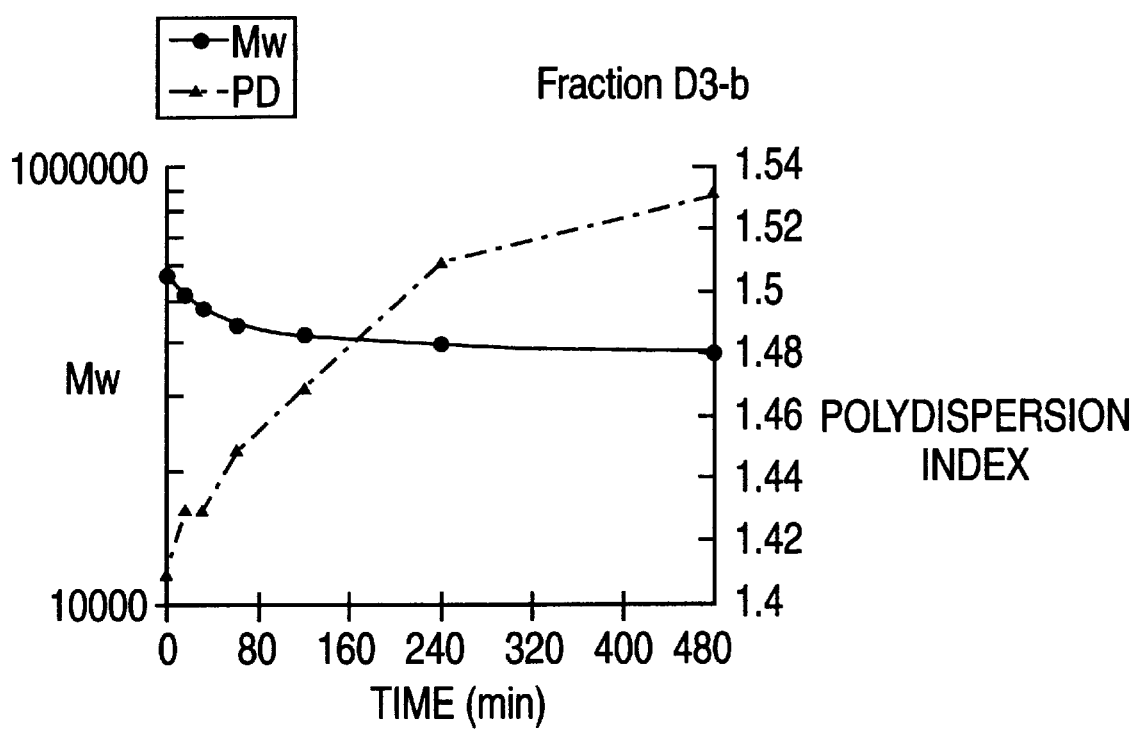
FIG. 3 represents the diagram of degradation kinetics of the depolymerization carried out on hyaluronic acid fraction D3-b, the time (hr) is reported on the abscissae axis, the average molecular weights are reported on the left ordinates axis and the polydipsersion indexes are reported on the right ordinates axis.
Figure 4:
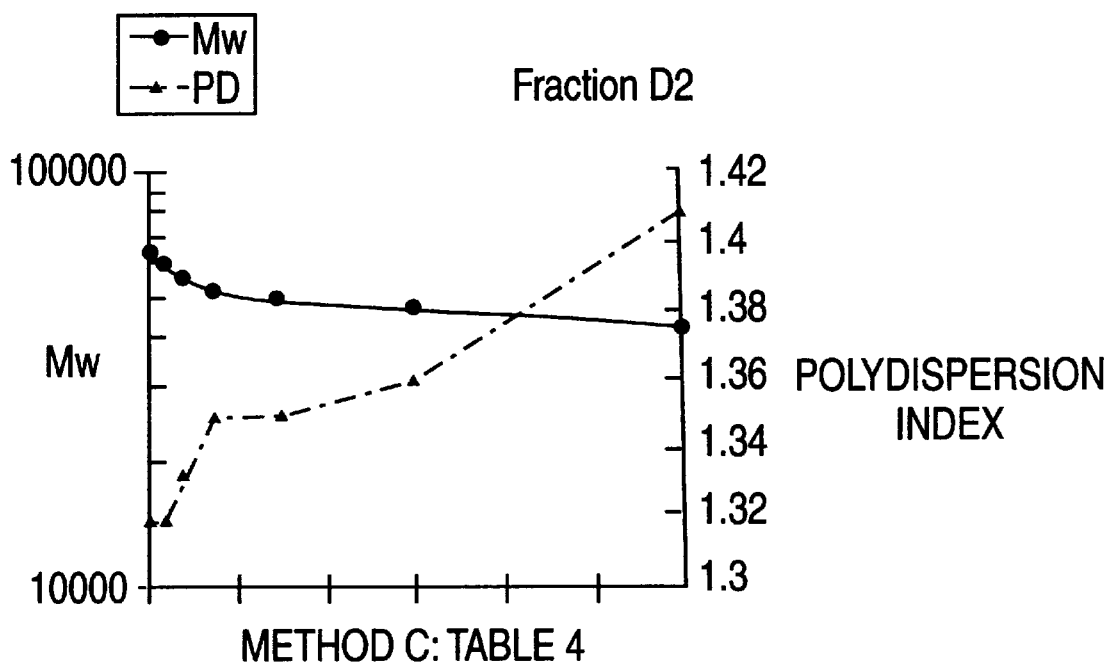
FIG. 4 reports the diagram of degradation kinetics of the depolymerization carried out on hyaluronic acid fraction D2 in the form of a diagram wherein the time (hr) is reported on the abscissae axis, the average molecular weights are reported on the left ordinates axis and the polydipsersion indexes are reported on the right ordinates axis.

The data and relative graphs (FIGS. 3 and 4) show that it is impossible to produce HA fractions with the desired MW by using method 'A'. Even by increasing the time of ultrasound treatment, or modifying the chemical depolymerization conditions, it is still not possible to obtain a finished product characterized by a polydispersion index <1.7 and with a molecular weight of between 5,000 and 20,000.

Method 'B' also involves double treatment in two separate steps with ultrasounds and reaction with hypochlorite, starting with natural hyaluronic acid as described in method 'A', but does not produce fractions with the desired average MW or polydispersion index. To be precise, it has been noted that although the action of the ultrasounds does produce hyaluronic acid with a molecular weight of around 35,000 and polydispersion index of 1.5 (after 4 hours of treatment at 4° C.), the following chemical reaction with sodium hypochlorite has a devastating effect on the structural characteristics of the product, even under extremely bland conditions.

Method 'C', the innovative results of which are described in this invention, combines and controls the actions of the ultrasounds and sodium hypochlorite. The combined action involves the simultaneous use of these two factors over a time period of between 0 and 480 minutes. The chemical-physical degradation occurs in a solution of NaCl (0.15M at a temperature of 4° C., using 150 W ultrasounds with a frequency of 20 KHz, produced by a titanium-coated immersion probe. Moreover, a 5% solution of ONaCl is added in a molar concentration with regard to natural hyaluronic acid (MW about 1,000,000) ranging between 0.5 and 2.5 (mole of ONaCl/mole of hyaluronic acid).

At the set times for the reaction kinetics, an aliquot of solution is taken and precipitated in 5 volumes of a mixture of methanol/acetone. The product is then dried and analysed by GPC chromatography, using the two previously described means of measurement: while two serial columns of the TSK model (G2000 and G3000) are used for separation. The data from this analysis are reported in Table 4 (molecular weights) and in Table 5 (polydispersity). For a clearer picture of the results, the MW values obtained in the first step of method B (ultrasound treatment alone) have been included.

TABLE 4

| Time (min) | u.s. only (MW) | u.s. + 0.5 * (MW) | u.s. + 1 * (MW) | u.s. + 2.5* (MW) |
|---|---|---|---|---|
| 0 | 990,000 | 990,000 | 990,000 | 990,000 |
| 15 | 645,000 | 396,000 | 341,500 | 286,000 |
| 30 | 453,000 | 198,000 | 125,000 | 92,400 |
| 60 | 266,000 | 67,000 | 61,400 | 35,000 |
| 120 | 172,300 | 23,000 | 11,500 | 7,800 |
| 240 | 89,400 | 13,400 | <5,000 | <5,000 |
| 480 | 54,900 | <5,000 | <5,000 | <5,000 |

* = molar ratio NaClO/HA r.u.

TABLE 5

| Time (min) | u.s. only (MW) | u.s. + 0.5 * (MW) | u.s. + 1 * (MW) | u.s. + 2.5* (MW) |
|---|---|---|---|---|
| 0 | 1.40 | 1.40 | 1.40 | 1.40 |
| 15 | 1.45 | 1.32 | 1.42 | 1.50 |
| 30 | 1.51 | 1.34 | 1.45 | 1.53 |
| 60 | 1.56 | 1.38 | 1.60 | 1.55 |
| 120 | 1.60 | 1.44 | 1.63 | 1.7 |
| 240 | 1.60 | 1.55 | >1.7 | >1.7 |
| 480 | 1.65 | >1.7 | >1.7 | >1.7 |

* molar ratio NaClO/HA r.u.

Comparison of the data from the two series of analyses shows that it is possible to obtain at least three fractions with the required molecular profile. These three distinct products will be called by the code names D4 (time: 240 minutes; ONaCl 0.5), D5 (time: 120 minutes; ONaCl 1.0) and D6 (time: 120 minutes, ONaCl 2.5). They have molecular weights of 13,400, 11,500 and 7,800 respectively, and polydispersion index values of between 1.55 and 1.7.

MW values of less than 5,000 are very difficult to ascertain exactly as they are below the instrumental sensitivity limits, so fractions with such values are difficult to define.

Figure 5:
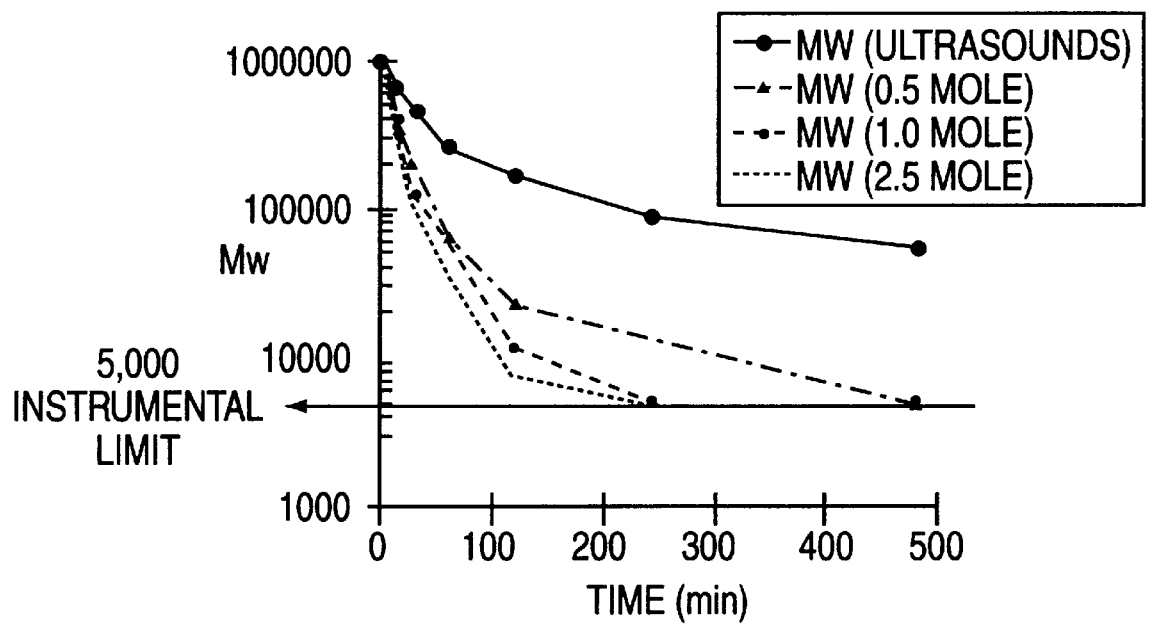
FIG. 5 represents the degradation kinetics of the depolymerization carried out on a starting hyaluronic acid having a molecular weight of 990,000 and a polydispersion index= 1.40, contemporaneously treated with ultrasounds and sodium hypochlorite with the following molar ratio NaClO/HA r.u.: 0.5, 1.0, 2.5 compared with the depolymerization carried out on the same hyaluronic acid treated only with ultrasounds, the average molecular weights are reported on the ordinates axis, whereas the time (minutes) is reported on the abscissae axis.
Figure 6:
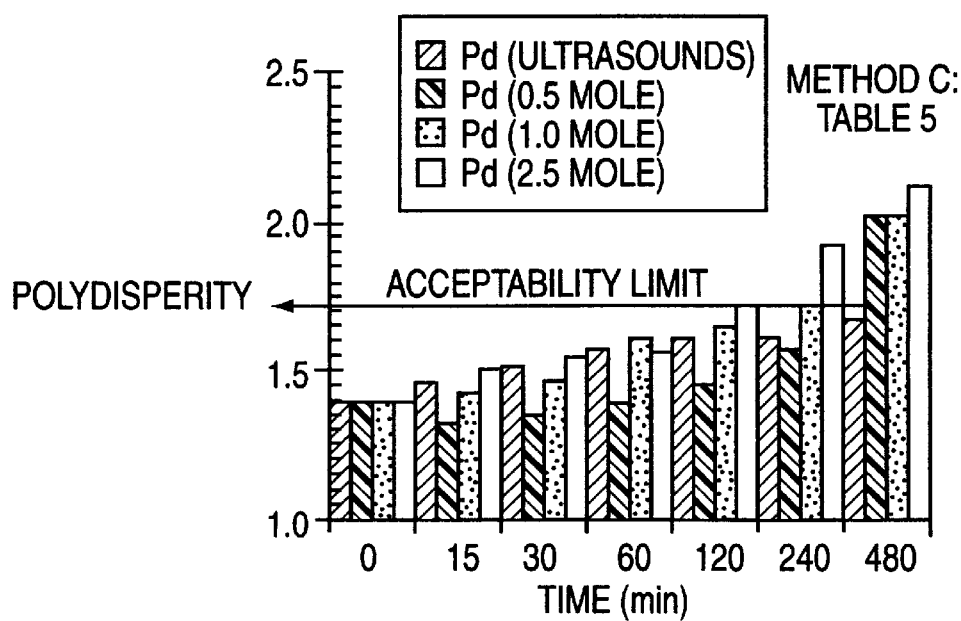
FIG. 6 represents the degradation kinetics of the depolymerization carried out on a hyaluronic acid having a molecular weight of 990,000 and a polydispersion index=1.40 contemporaneously treated with ultrasounds and sodium hypochlorite with the following molar ratio NaClO/HA r. u.: 0.5, 1.0, 2.5 compared with the depolymerization carried out on the same hyaluronic acid treated only with ultrasounds, the polydispersion indexes are reported on the ordinates axis, whereas the time (minutes) is reported on the abscissae axis.

It is interesting to note that the simultaneous, combined degradation method 'C' produces hyaluronic acid fractions which remain within the acceptable limits in terms of polydispersity of molecular weights. These results confirm the specificity of the depolymerization reaction and, judging by the curves in FIGS. 5 and 6, good kinetic control, confirmed by three tests performed using the following reaction parameters: ultrasound power 150 W, duration of 120 minutes and a molar concentration of ONaCl of 1 mole/mole of hyaluronic acid, starting from the same hyaluronic acid used in the preceding experiment and the corresponding data reported on Table 6 demonstrate that the degradation process is reproducible when the same experimental conditions are used.

TABLE 6

| Product | MW | PD | Reaction yield |
|---------|--------|------|----------------|
| D5-a | 11,100 | 1.60 | 55% |
| D5-b | 10,700 | 1.55 | 61% |
| D5-c | 12,000 | 1.60 | 65% |

We report herewith the following examples for illustrative, but not for limitative purposes of the process according to the present invention.

EXAMPLE 1
Preparation of Hyaluronic Acid with a Molecular Weight of Between 5,000 and 10,000

2.40 gr of hyaluronic acid sodium salt with a molecular weight of 990,000 Da, from hyaluronic acid obtained by extraction, is solubilized in 240 ml of a 0.15M solution of NaCl. 7.9 ml of a 14% solution of NaOCl are added. While keeping the temperature at +4° C., the resulting solution is treated for 120 minutes with ultrasounds at a strength of 150 W and at a frequency of 20 KHz.

Once the reaction is completed, as seen from a drop in viscosity, the pH is brought to 6.5 with 0.1N HCl and then precipitated in 1,000 ml of a mixture of methanol-acetone 2:1. The product is separated by filtration and vacuum-dried at 45° C. for 48 hours.

1.65 gr in sodium form are thus obtained (code HA-D9-Na). HPLC-GPC analysis reveals that the hyaluronic acid fraction obtained has an average molecular weight (MW) of 5,850, a molecular weight average number (MN) of 3,640 and a polydispersion index of 1.61.

FT-IR spectroscopy in comparison to natural hyaluronic acid did not reveal any abnormalities in the spectrum. Lastly, analysis of the percentage of hyaluronic acid present, obtained by the method using carbazol for the determination of D-glucuronic acid, shows 95% purity.

EXAMPLE 2
Preparation of Hyaluronic Acid with a Molecuzar Weight of Between 10,000 and 15,000

2.5 gr of hyaluronic acid sodium salt with a MW of 740,000 Da, from hyaluronic acid obtained by extraction, is solubilized in 250 ml of a 0.15M solution of NaCl. 3.3 ml of a 14% solution of ONaCl is added. Keeping the temperature at +4° C., the resulting solution is treated for 120 min. with ultrasounds at a strength of 150 W and at a frequency of 20 KHz.

Once the reaction is completed as seen by a drop in the viscosity, the pH is brought to 6.5 with O.1N HCl and then precipitated in 1,000 ml of a mixture of methanol-acetone 2:1. The product is separated by filtration and vacuum-dried at 45° C. for 48 hours.

1.50 gr in sodium form are thus obtained (code HA-D9-Na). HPLC-GPC analysis reveals that the hyaluronic acid fraction obtained has an average molecular weight (MW) of 11,650, a molecular weight number average (MN) of 7,330 and a polydispersion index of 1.59.

FT-IR spectroscopy in comparison to natural hyaluronic acid did not reveal any abnormalities in the spectrum. Lastly, analysis of the percentage of hyaluronic acid present, obtained by the method using carbazol for the determination of D-glucuronic acid, shows 98% purity.

EXAMPLE 3
Preparation of Hyaluronic Acid with a Molecular Weight of Between 15,000 and 25,000

1.00 gr of hyaluronic acid sodium salt with a molecular weight of about 1,000,000 Da, from hyaluronic acid obtained by extraction, is solubilized in 100 ml of a 0.15M solution of NaCl. 0.6 ml of a 14% solution of ONaCl are added. While keeping the temperature at +4° C., the resulting solution is treated for 120 minutes with ultrasounds at a strength of 150 W and at a frequency of 20 KHz.

Once the reaction is completed, as seen from a drop in viscosity, the pH is brought to 6.5 with 0.1N HCl and then precipitated in 500 ml of a mixture of methanol-acetone 2:1. The product is separated by filtration and vacuum-dried at 45° C. for 48 hours.

0.65 gr in sodium form are thus obtained (code HA-D8-Na). HPLC-GPC analysis reveals that the hyaluronic acid fraction obtained has an average molecular weight (MW) of 22,500, a molecular weight number average (MN) of 15,550 and a polydispersion index of 1.45.

FT-IR spectroscopy in comparison to natural hyaluronic acid did not reveal any abnormalities in the spectrum. Lastly, analysis of the percentage of hyaluronic acid present, obtained by the method using carbazol for the determination of D-glucuronic acid, shows 97% purity. The hyaluronic acid fractions obtained by the process of the present invention can be widely used in the preparation of pharmaceutical compositions with properties of cellular interaction in the tissue repair mechanisms, angiogenesis and bone formation.

Moreover, these hyaluronic acid fractions can be used in industrial processes for the production of auto crosslinked hyaluronic acid, according to the method described in EP patent No. 0341745 B1, to be used in the preparation of pharmaceutical compositions for ophthalmic use or mechanisms containing compounds with anaesthetic, antiinflammatory, vasoconstrictor, antibiotic, antibacterial, antiviral action.

The hyaluronic acid derivatives can also be used for the preparation of health-care and surgical articles and in the fields of industry, foodstuffs and cosmetics.

Said fractions can also undergo esterification processes for the preparation of esterified hyaluronic acid, according to the method described in EP patent No. 0216453 B1, for use in ophthalmology, dermatology, otorhinolaryngology, dentistry, angiology, gynaecology and in the field of neurology for the preparation of health-care and surgical articles.

Besides synthesizing auto crosslinked and esterified hyaluronic acid, it is possible to use the hyaluronic acid fraction obtained with the process according to the present invention for preparing sulfated hyaluronic acid according to the method described in patent application No. PCT WO 95/25751, for use in ophthalmology, dermatology, in otorhinolaryngology, dentistry, angiology. gynaecology, urology, haemodialysis, cardiology, extracorporeal circulation, as biomedical products and for coating the same, as a vehicle for the controlled release of drugs, in the treatment of inflammation and to accelerate the wound healing processes in wounds and burns.

The invention being thus described, it is clear that these methods can be modified so as to obtain hyaluronic acid fractions with a molecular weight of up to 300,000 Da, starting from the natural polymer obtained from animal, biotechnological or biosynthetic sources. Such modifica- What is clamed is:

1. Hyaluronic acid having an average molecular weight ranging from 5,000 to 300,000 and a polydispersion index of ≦1.7 which is obtained by a process comprising treating a starting hyaluronic acid or a salt thereof having an average molecular weight ranging from 50,000 to 10,000,000 with ultrasound contemporaneously in the presence of sodium hypochlorite at such concentrations that the molar ratio of sodium hypochlorite/hyaluronic acid repeating unit is comprised between 0.01 and 5 for a time less than 240 minutes.

2. The hyaluronic acid according to claim 1, wherein the hyaluronic acid has an average molecular weight ranging from 5,000 to 50,000.

3. The hyaluronic acid according to claim 1, wherein the hyaluronic acid has an average molecular weight ranging from 5,000 to 10,000.

4. The hyaluronic acid according to claim 1, wherein the hyaluronic acid has an average molecular weight ranging from 10,000 to 15,000.

5. The hyaluronic acid according to claim 1, wherein the hyaluronic acid has an average molecular weight ranging from 15,000 to 25,000.

6. The hyaluronic acid according to claim 1, wherein the hyaluronic acid has an average molecular weight ranging from 25,000 to 50,000.

7. Auto crosslinked hyaluronic acid derivative obtained from hyaluronic acid according to claim 1.

8. A pharmaceutical composition containing as the active ingredient a therapeutically effective amount of at least one auto crosslinked hyaluronic acid derivative obtained from the hyaluronic acid according to claim 1.

9. An ophthalmic composition containing as the active ingredient a therapeutically effective amount of at least one auto crosslinked hyaluronic acid derivative obtained from the hyaluronic acid according to claim 1.

10. A pharmaceutical composition containing as the active ingredient a therapeutically effective amount of at least one auto crosslinked hyaluronic acid derivative obtained from the hyaluronic acid according to claim 1, further comprising a therapeutically effective amount of an active ingredient selected from the group consisting of an antiinflammatory, anaesthetic, vasoconstrictor, antibiotic, antibacterial, and antiviral agent.

11. Hyaluronic acid esters, obtained from the hyaluronic acid according to claim 1.

12. An ophthalmological device containing at least one hyaluronic acid ester obtained from the hyaluronic acid according to claim 1.

13. A dermatological device containing at least one hyaluronic acid ester obtained from the hyaluronic acid according to claim 1.

14. A otorhinolaryngological device containing at least one hyaluronic acid ester obtained from the hyaluronic acid according to claim 1.

15. A angiological device containing at least one hyaluronic acid ester obtained from the hyaluronic acid according to claim 1.

16. A dental device containing at least one hyaluronic acid ester obtained from the hyaluronic acid according to claim 1.

17. A gynecological device containing at least one hyaluronic acid ester obtained from the hyaluronic acid according to claim 1.

18. A neurological device containing at least one hyaluronic acid ester obtained from the hyaluronic acid according to claim 1.

19. A surgical article containing the auto crosslinked hyaluronic acid derivatives or the hyaluronic acid esters obtained from the hyaluronic acid according to claim 1.

20. Health care products containing the auto crosslinked hyaluronic acid derivatives or the hyaluronic acid esters obtained from the hyaluronic acid according to claim 1.

21. Sulfated hyaluronic acid obtained from the hyaluronic acid according to claim 1.

22. An ophthalmological device containing or coated by a sulphated hyaluronic acid derivative obtained from the hyaluronic acid according to claim 1.

23. A dermatological device containing or coated by a sulfated hyaluronic acid derivative obtained from the hyaluronic acid according to claim 1.

24. An otorhinolaryngological device containing or coated by a sulfated hyaluronic acid derivative obtained from the hyaluronic acid according to claim 1.

25. A dental device containing or coated by a sulfated hyaluronic acid derivative obtained from the hyaluronic acid according to claim 1.

26. An angiological device containing or coated by a sulfated hyaluronic acid derivative obtained from the hyaluronic acid according to claim 1.

27. A gynecological device containing or coated by a sulfated hyaluronic acid derivative obtained from the hyaluronic acid according to claim 1.

28. An urological device containing or coated by a sulfated hyaluronic acid derivative obtained from the hyaluronic acid according to claim 1.

29. A hemodialysis device containing or coated by a sulfated hyaluronic acid derivative obtained from the hyaluronic acid according to claim 1.

30. A cardiological device containing or coated by a sulfated hyaluronic acid derivative obtained from the hyaluronic acid according to claim 1.

31. An extracorporeal circulation device containing or coated by a sulfated hyaluronic acid derivative obtained from the hyaluronic acid according to claim 1.

32. A controlled release pharmaceutical composition containing as the vehicle sulfated hyaluronic acid derivative obtained from the hyaluronic acid according to claim 1.

33. A pharmaceutical composition containing as the active ingredient sulfated hyaluronic acid derivative obtained from the hyaluronic acid according to claim 1, in combination with suitable excipients and diluents.

34. A therapeutic method for the treatment of inflammation processes comprising administering to a patient in need of such treatment a therapeutically effective amount of a sulfated hyaluronic acid derivative obtained from the hyaluronic acid according to claim 1.

35. A therapeutic method for accelerating healing processes in wounds and burns, comprising administering to a patient in need of such a treatment a therapeutically amount of a sulfate hyaluronic acid derivative obtained from the hyaluronic acid according to claim 1.

36. A therapeutic method for repairing tissues, comprising administering to a patient in need of such a treatment a therapeutically active amount of a hyaluronic acid ester obtained from the hyaluronic acid according to claim 1.

37. A therapeutic method for promoting bone formation, comprising administering to a patient in need of such a treatment a therapeutically active amount of a hyaluronic acid ester obtained from the hyaluronic acid according to claim 1.

38. A therapeutic method for promoting angiogenesis, comprising administering to a patient in need of such a treatment a therapeutically active amount of a hyaluronic acid ester obtained from the hyaluronic acid according to claim 1.

* * * * *